United States Patent
Kime et al.

(10) Patent No.: US 7,657,936 B2
(45) Date of Patent: Feb. 2, 2010

(54) METHOD FOR PREVENTING TIME OF CHECK TO TIME OF USE EXPLOITS

(75) Inventors: Christopher F. Kime, Austin, TX (US); Brian H. Horton, Pflugerville, TX (US); Christian Lita, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 913 days.

(21) Appl. No.: 11/333,519

(22) Filed: Jan. 17, 2006

(65) Prior Publication Data
US 2007/0199045 A1 Aug. 23, 2007

(51) Int. Cl.
*G06F 21/00* (2006.01)
(52) U.S. Cl. .......................... 726/22; 713/164
(58) Field of Classification Search .................. 726/21, 726/22; 713/164
See application file for complete search history.

(56) References Cited

U.S. PATENT DOCUMENTS 7,207,065 B2 * 4/2007 Chess et al. .................. 726/25
7,266,688 B2 * 9/2007 Fronberg ..................... 713/164

* cited by examiner

*Primary Examiner*—Gilberto Barron, Jr.
*Assistant Examiner*—Simon Kanaan
(74) *Attorney, Agent, or Firm*—Stephen J. Walder, Jr.; Jeffrey S. LeBaw

(57) ABSTRACT

A method for preventing time of check to time of use exploits includes receiving a system call from a user space at a system call intercept and copying user space parameters from the user space to a kernel space responsive to the system call. The method also includes copying the user space parameters from the kernel space to a secure location in the user space, receiving the user space parameters from the secure location at the system call intercept, and executing the system call based on the received user space parameters. A computer readable medium including computer readable code and a system for executing the method steps are also disclosed.

20 Claims, 9 Drawing Sheets

FIG. 1           150

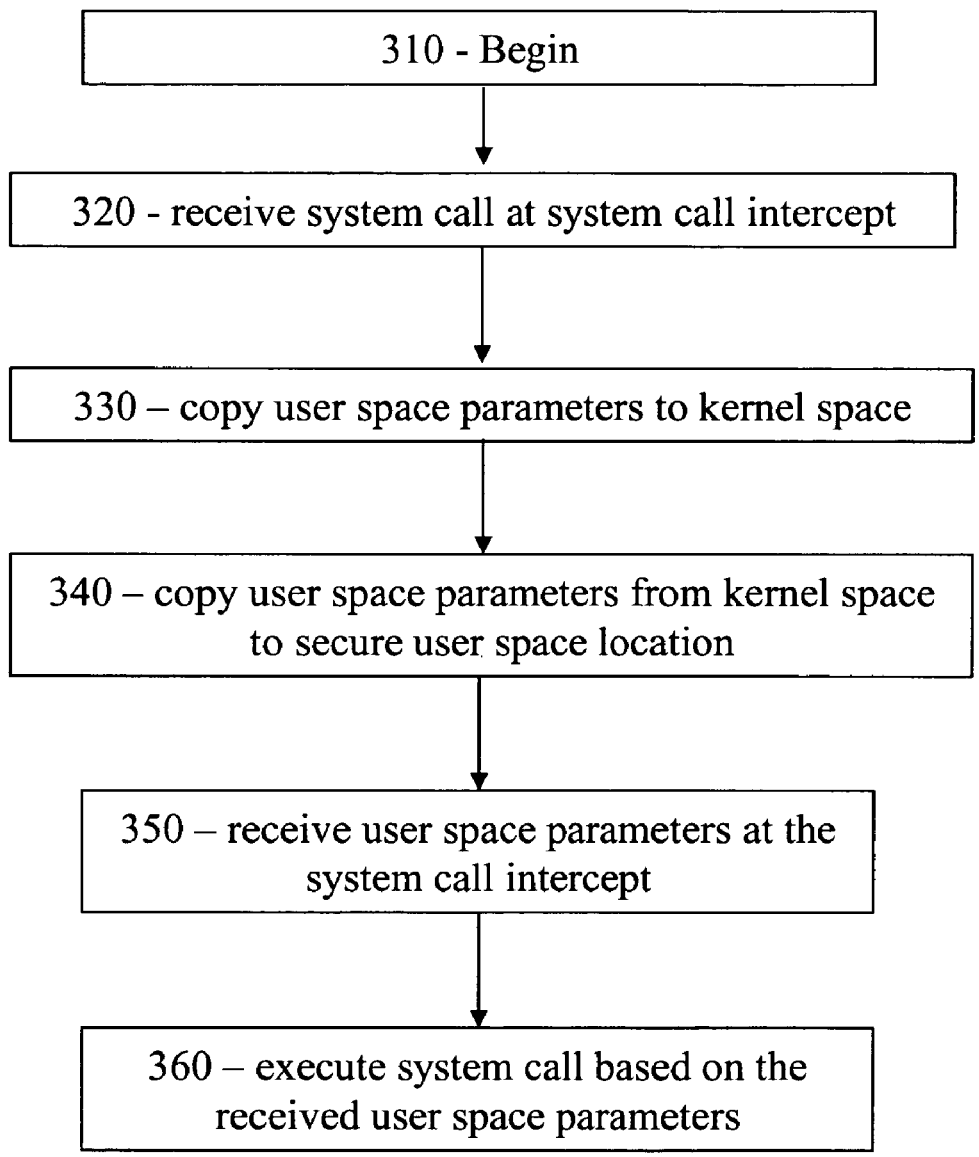

METHOD FOR PREVENTING TIME OF CHECK TO TIME OF USE EXPLOITS

FIELD OF INVENTION

The present invention generally relates to system calls in operating systems. More specifically, the invention relates to preventing time of check to time of use exploits.

BACKGROUND OF THE INVENTION

Many operating systems divide memory into a kernel space and a user space. System calls in the operating system include parameters supporting the system call, and the parameters can be stored in either the user space or the kernel space. System call parameters that are too large to fit into parameter registers, such as string data, must be passed using a reference to the parameter data in user space. This data must be copied into kernel space for processing by kernel modules or the kernel itself. For example, in the implementation of the LINUX kernel module LOMAC, a system call parameter can be stored in the kernel space so that a user space program thread cannot alter the system call parameter. This kernel-space address can then be modified so that it can be used as a user-space address for the actual system call invocation.

However, in other operating systems, such as Solaris, AIX, and HP-UX, the system call parameters must be stored in user space. Storing the system call parameters in user space presents a disadvantage for kernel modules that intercept system calls wherein they are vulnerable to a time to check to time of use exploit ("TOCTOU") that could lead to inconsistent evaluation of the system call parameters by the kernel module's system call intercept and the kernel's system call. A TOCTOU results from the time gap between issuance of the system call, and the kernel accessing the parameters. This time gap exposes the parameters to alteration from a multithreaded application.

For example, a multithreaded application intent on exploiting TOCTOU, repeatedly calls open( ) with a file path string, while a second thread continually changes the file path string from a path that the process has permission to access to a path that the process is not authorized to access. For example, a process is authorized to access /etc/a but not /etc/b. The process issues the system call to /etc/a and alters the path to etc/b. In a successful TOCTOU, the parameters eventually cross during the time gap, and the process will undesirably be granted access to /etc/b.

Potential solutions to prevent a TOCTOU have required a significant amount of platform specific code. Some solutions have even required kernel release specific code. Both solutions undesirably can result in significant repeated labor. Other solutions rely on mechanisms that may not be implemented across all platforms. Another solution relies on extending the heap of the process to acquire a page of memory such that the process does not have a reference to the memory. However, such a 'heap' solution is susceptible to a brute force memory exploration in the event that the TOCTOU application is aware or suspects such a defensive tactic.

It is therefore a challenge to develop a method to prevent TOCTOU exploits and to overcome these, and other, disadvantages.

SUMMARY OF THE INVENTION

A first embodiment of the invention provides a method for preventing time of check to time of use exploits including receiving a system call from a user space at a system call intercept and copying user space parameters from the user space to a kernel space responsive to the system call. The method also includes copying the user space parameters from the kernel space to a secure location in the user space, receiving the user space parameters from the secure location at the system call intercept, and executing the system call based on the received user space parameters.

A second embodiment of the present invention is a computer usable medium including computer readable code for preventing time of check to time of use exploits including computer readable code for receiving a system call from a user space at a system call intercept and computer readable code for copying user space parameters from the user space to a kernel space responsive to the system call. The medium also includes computer readable code for copying the user space parameters from the kernel space to a secure location in the user space, computer readable code for receiving the user space parameters from the secure location at the system call intercept, and computer readable code for executing the system call based on the received user space parameters.

A third embodiment of the present invention is a system including means for preventing time of check to time of use exploits including means for receiving a system call from a user space at a system call intercept and means for copying user space parameters from the user space to a kernel space responsive to the system call. The system also includes means for copying the user space parameters from the kernel space to a secure location in the user space, means for receiving the user space parameters from the secure location at the system call intercept, and means for executing the system call based on the received user space parameters.

The foregoing embodiment and other embodiments, objects, and aspects as well as features and advantages of the present invention will become further apparent from the following detailed description of various embodiments of the present invention. The detailed description and drawings are merely illustrative of the present invention, rather than limiting the scope of the present invention being defined by the appended claims and equivalents thereof.

BRIEF DESCRIPTION OF THE DRAWINGS

FIG. 3 illustrates an embodiment of a method for preventing time of check to time of use exploits in accordance with one aspect of the invention;

DETAILED DESCRIPTION OF THE PRESENT INVENTION

Figure 1:
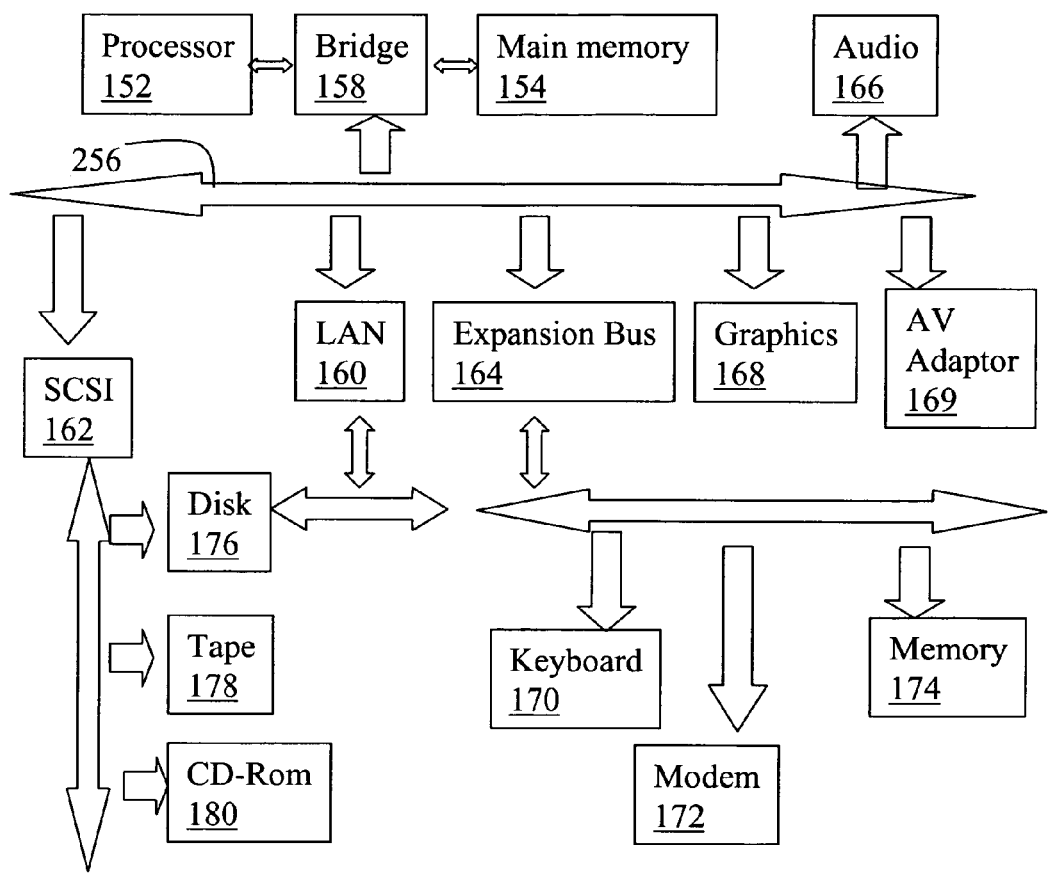
FIG. 1 illustrates one embodiment of a computer for use in a method for preventing time of check to time of use exploits in accordance with one aspect of the invention.

FIG. 1 illustrates one embodiment of a computer client 150 for use in accordance with one aspect of the invention. Computer system 150 employs a peripheral component interconnect (PCI) local bus architecture. Although the depicted example employs a PCI bus, other bus architectures such as Micro Channel and ISA may be used. PCI bridge 158 connects processor 152 and main memory 154 to PCI local bus 156. PCI bridge 158 also may include an integrated memory controller and cache memory for processor 152. Additional connections to PCI local bus 156 may be made through direct component interconnection or through add-in boards. In the depicted example, local area network (LAN) adapter 160, SCSI host bus adapter 162, and expansion bus interface 164 are connected to PCI local bus 156 by direct component connection. In contrast, audio adapter 166, graphics adapter 168, and audio/video adapter (A/V) 169 are connected to PCI local bus 156 by add-in boards inserted into expansion slots. Expansion bus interface 164 connects a keyboard and mouse adapter 170, modem 172, and additional memory 174 to bus 156. SCSI host bus adapter 162 provides a connection for hard disk drive 176, tape drive 178, and CD-ROM 180 in the depicted example. In one embodiment, the PCI local bus implementation support three or four PCI expansion slots or add-in connectors, although any number of PCI expansion slots or add-in connectors can be used to practice the invention.

An operating system runs on processor 152 to coordinate and provide control of various components within computer system 150. The operating system may be any appropriate available operating system such as Windows, Macintosh, UNIX, AIX, HP-UX, LINUX, or OS/2, which is available from International Business Machines Corporation. "OS/2" is a trademark of International Business Machines Corporation. Instructions for the operating system, an object-oriented operating system, and applications or programs are located on storage devices, such as hard disk drive 176 and may be loaded into main memory 154 for execution by processor 152.

Those of ordinary skill in the art will appreciate that the hardware in FIG. 1 may vary depending on the implementation. For example, other peripheral devices, such as optical disk drives and the like may be used in addition to or in place of the hardware depicted in FIG. 1. FIG. 1 does not illustrate any architectural limitations with respect to the present invention, and rather merely discloses an exemplary system that could be used to practice the invention. For example, the processes of the present invention may be applied to multiprocessor data processing system.

Figure 2:
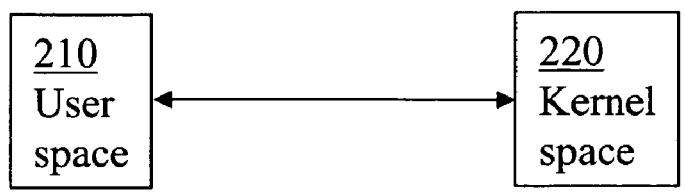
FIG. 2 illustrates an embodiment of an operating system for a method for preventing time of check to time of use exploits in accordance with one aspect of the invention.

FIG. 2 illustrates an operating system user space 210 and kernel space 220 in communication with each other at 201, in accordance with one aspect of the invention. User space 210 is operable to send system calls to kernel space 220 and to store parameters for the system call. The user space is configured to have sufficient memory space to store at least two copies of the parameters for the system call, although it is preferred that the user space include sufficient memory so that the amount of memory occupied by the system call parameters is not material to operation of the user space. Kernel space 220 is operable to receive system calls from the user space, and to execute the system calls based on parameters stored in the user space.

FIG. 3 illustrates one embodiment of a method 300 of preventing TOCTOU exploits in accordance with one aspect of the invention. Method 300 begins at 310.

A system call intercept within kernel space, such as kernel space 220, intercepts a system call at 320. A system call intercept is any computer code configured to receive a system call, parse the system call to determine the parameters of the system call and execute the system call, if appropriate. In one embodiment, the system call intercept is a portion of an operating system. In one embodiment, the system call intercept is a module of an operating system. In one embodiment, the system call intercept performs additional processing of the system call based upon the parameters passed to the system call. The system call includes parameters required to successfully execute the system call. These parameters are termed "user space parameters" in this application. The required parameters are stored in user space at a memory location mapped to the system call interrupt. For example, the system call can be the open( ) call, and the parenthetical contents (i.e., the characters between the parentheses) are the user space parameters.

In one embodiment, the kernel module performing the system call intercept implements at least one new entry points into the kernel. In embodiments implementing new kernel entry points, one such new entry point initializes data necessary to coordinate access to shared memory resources that are controlled by the process that issued the system call, kernel_param_copy_init( ). Parameters for kernel_param_copy_init( ) includes parameters indicative of the size of the memory to be shared and the identity of the shared memory. The identity of the shared memory can then be used to map the memory into the address space of at least one other process as appropriate after its creation, such as with use of the shmat( ) function. Additionally, another thread of the process uses the entry point kernel_param_copy_service( ) to pend in the kernel to service requests to copy system call parameter data to shared memory managed by the process that issued the system call.

Figure 7:
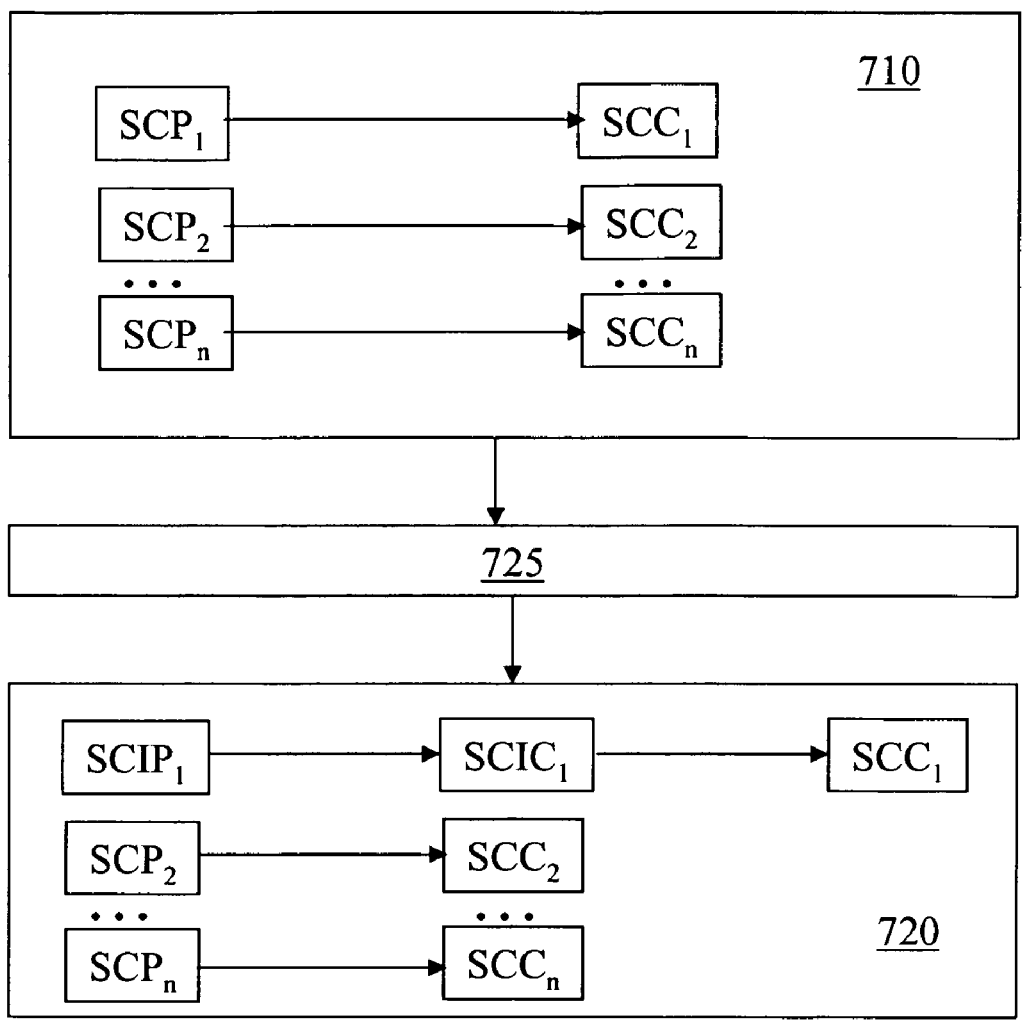
FIG. 7 illustrates one embodiment of a system call interrupt in accordance with one aspect of the invention.

FIG. 7 illustrates schematically a system call intercept intercepting system calls at 700. As illustrated at 700, the operating system includes user space 710 and kernel space 720, with system call intercept 725 receiving system calls to the kernel space 720 from user space 710. Within user space 710, N number of System Call Pointers ("SCP$_n$") point to N number of System Call Codes ("SCC$_n$"). Within kernel space, N number of System Call Pointers ("SCP$_n$") point to N number of System Call Codes ("SCC$_n$") except one illustrated SCP points to a System Call Intercept Code (SCIC$_1$) that lies between the SCIP and SCC.

Returning to method 300, in response to the received system call, the user space parameters are copied to kernel space at step 330. In one embodiment, copying of the user space parameters is controlled by the system call intercept. In one embodiment, receiving the system call during step 320 activates a trusted daemon, and the trusted daemon controls the copying of the user space parameters. In one embodiment, kernel_param_copy_service( ) services the copying of the user space parameters. As used herein, the term "trusted" means a process that is not subject to operations or control by a user space entity. Alternatively, a trusted process has privileges to circumvent a system security policy and has been tested and verified to operate only as intended.

Based on the copying of user space parameters into the kernel space, a secure user space location is created and mapped into the address space of the process whose system call has been intercepted, and the user space parameters are copied from the kernel space to the secure user space location at step 340. In one embodiment, the secure user space location is a shared memory location. In one embodiment, the trusted daemon creates the secure user space location and manages the copying, while in other embodiments, the system call interrupt performs these activities. A secure user space location is a memory location with read and/or write privileges held only by kernel space entities/processes so that no user space entity/process is able to read or write to the secure user space location. In one embodiment, the secure user space location is a read only memory location. In one embodiment, the secure user space location is persisted at a specified location, while in other embodiments, the secure user space location is not persisted and is created and located based on each system call that is reliant on user space parameters. In one embodiment, three copies of the user space parameters exist after execution of step 340—the original copy, the kernel space copy, and the secure location copy. In one embodiment, the kernel space copy is removed after creation of the secure location copy so that two copies of the user space parameters exist.

Figure 8:
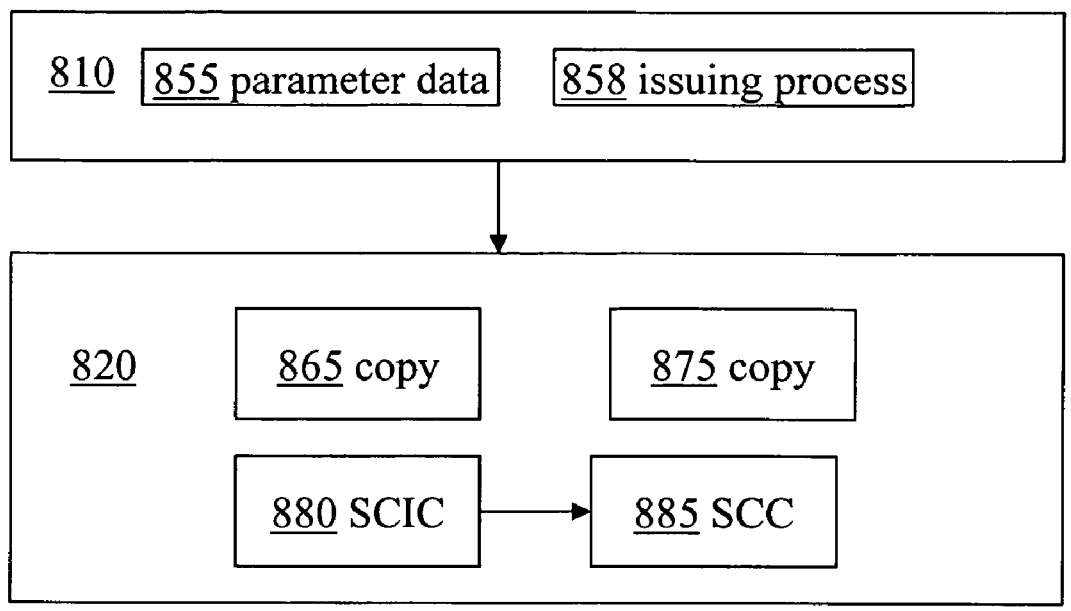
FIG. 8 illustrates another embodiment of a system call interrupt in accordance with another aspect of the invention.

FIG. 8 illustrates a graphical depiction 800 of user space 810 and kernel space 820. As shown, user space 850 includes user space parameter data 855 stored in a memory location and an operating issuing process 858. The user space is in communication with kernel space 860, and first copy 865 and second copy 875 of the user space parameters are stored in kernel space memory, as well as the system call intercept code (SCIC) 880 and system call code (SCC) 885. First and second copy 865, 875 are written to different memory locations in kernel space 860.

In one embodiment, the kernel space management of the secure location is controlled using system calls shmget( ) and shmat( ) and is initialized with reference to kernel_param_copy_init( ). When issuing kernel_param_copy_init( ), the command should pass the size and identity of the secure space, as specified to and returned from shmget( ), respectively. The controller of this process, i.e. the trusted daemon, creates a thread (called the service thread) that calls the kernel_param_copy_service( ) entry point and services the copying of the system call parameter data so that the only entity that can modify the copied data is the trusted daemon. In one embodiment, the service thread comprises a daemon.

Figure 4:
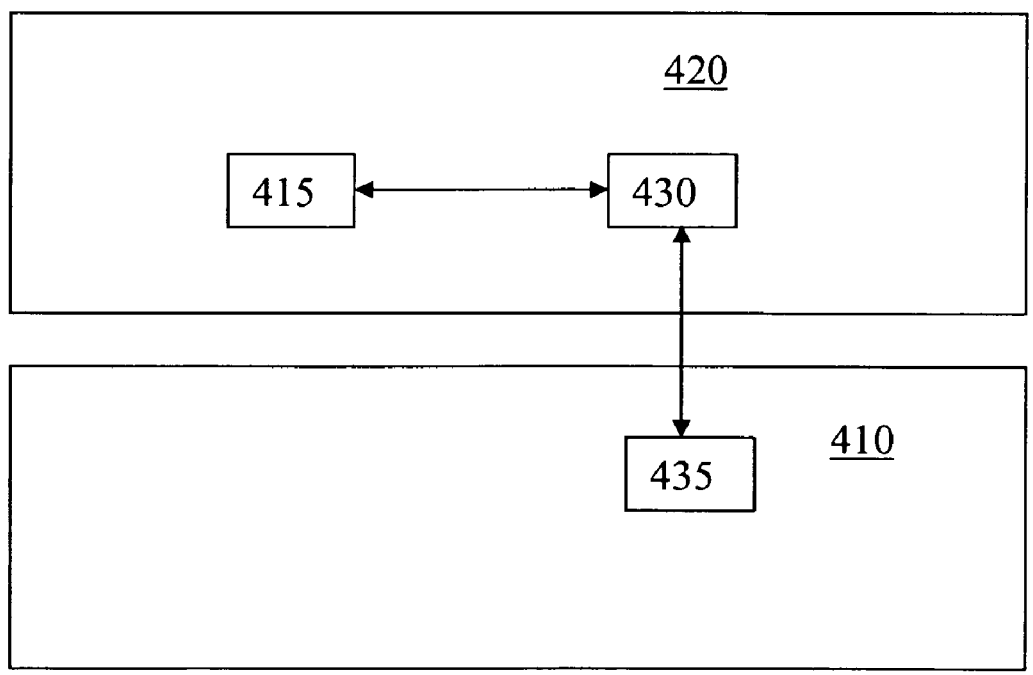
FIG. 4 illustrates an embodiment of an operating system for a method for preventing time of check to time of use exploits in accordance with one aspect of the invention.

FIG. 4 illustrates user space 410 and kernel space 420. System call interrupt 415 is shown communicating with service thread 430 within kernel space 420. Service thread 430 is illustrated communicating with secure location 435 in user space 410.

Returning to the discussion of method 300, based on the presence of the user space parameters in the secure user space location, the user space parameters are provided to the system call intercept at step 350. The user space parameters are provided in the form of a pointer to the secure user space location, in one embodiment. Alternatively, in another embodiment, the service thread passes the pointer. In another embodiment, the parameters are provided to the system call intercept in response to a direct request from one of the system call intercept or the daemon. In one embodiment, the user space parameters in the secure user space location are mapped into the processes whose system calls are being intercepted.

The system call is executed based on the received user space parameters at step 360. The received user space parameters are the user space parameters from the secure location. In one embodiment, the secure location is closed to all requests after the user space parameters are copied into the secure location and until the system call executes. In another embodiment, the secure location is closed to all requests after the user space parameters are copied into the secure location and until the service thread that created the secure location is notified of system call execution.

Figure 5:
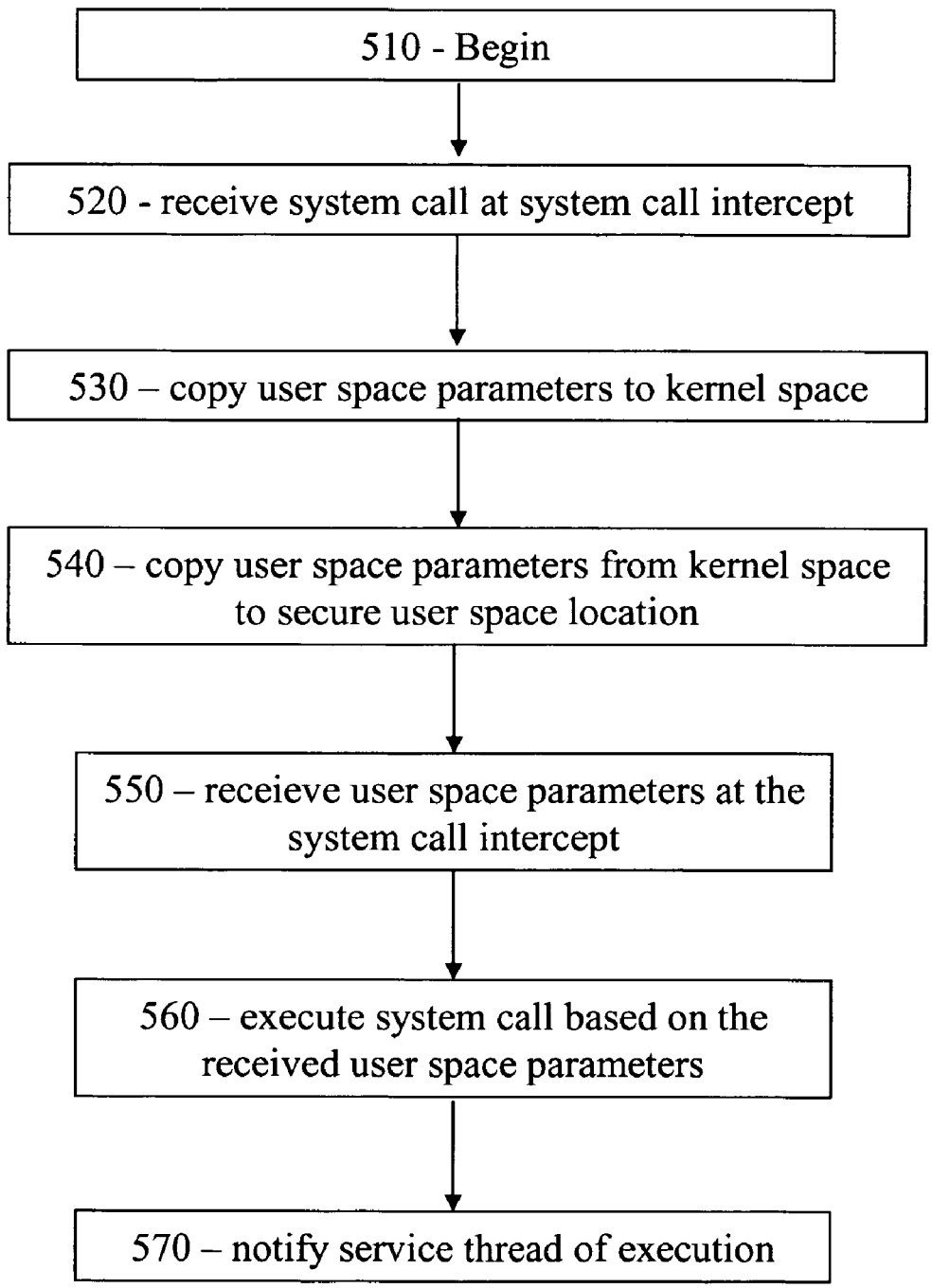
FIG. 5 illustrates another embodiment of a method for preventing time of check to time of use exploits in accordance with one aspect of the invention.

FIG. 5 illustrates another embodiment of a method 500 for preventing TOCTOU exploits, in accordance with an aspect of the invention. Method 500 begins at 510, and continues at 520 wherein a system call from user space is received at a system call intercept in kernel space. In one embodiment, step 520 is implemented as in step 320.

After receiving the system call in kernel space, user space parameters associated with the system call are copied from user space to kernel space at step 530. In one embodiment, step 530 is implemented as in step 330. The user space parameters are then copied from kernel space to a secure user space location at step 540. In one embodiment, step 540 is implemented as in step 340. The system call intercept receives the user space parameters from the secure user space location at step 550. In one embodiment, step 550 is implemented as in step 350. The system call is then executed based on the received user space parameters in step 560. In one embodiment, step 560 is implemented as in step 360.

After executing the system call, the service thread is notified of the execution at step 570. In one embodiment, the service thread allows the secure user space location to open for further use for the next system call from user space in response to the notification of system call execution. In one embodiment, the secure location is closed to all requests after the user space parameters are copied to the secure location, and until the service thread is notified of system call execution. Use of a new secure location for each system call can disadvantageously occupy memory, while increasing security by changing the location of the storage. Other embodiments will utilize a new location for the secure location with each successive system call, while releasing the prior location to general usage. "Returning" the secure location allows the secure location to be reclaimed and used for a different copy of system call parameter data or any other process requirements depending on implementation.

Figure 6:
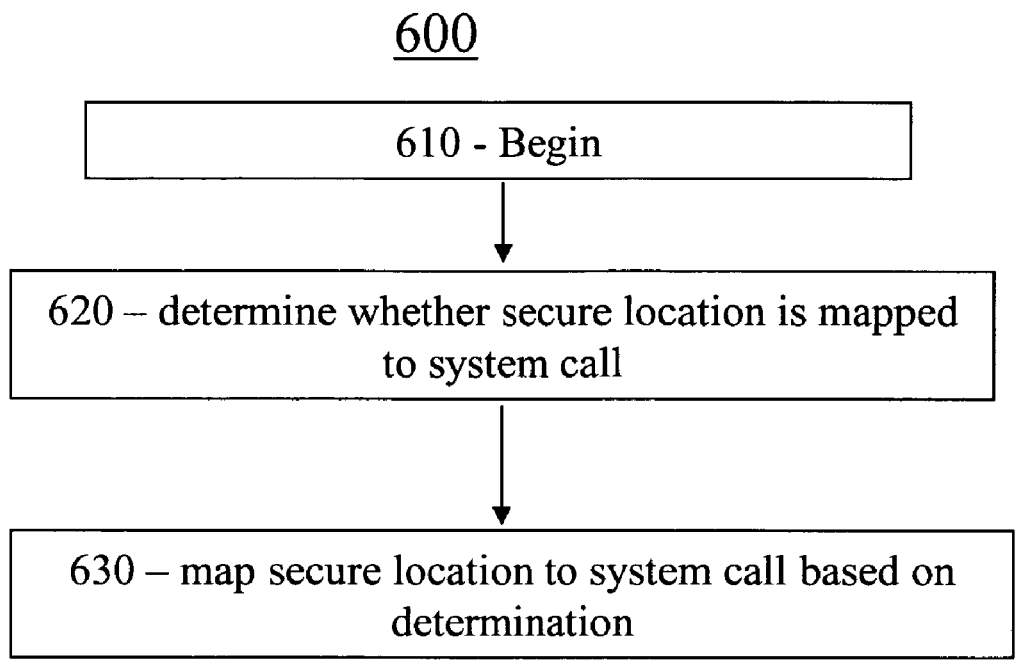
FIG. 6 illustrates an embodiment of a method to map a secure location to a user space process, in accordance with one aspect of the invention.

FIG. 6 illustrates one embodiment of a method 600 for copying user space parameters from the kernel space to a secure location in user space, in accordance with one aspect of the invention. Method 600 begins at 610. Method 600 determines whether the secure location is already mapped to the process making the system call at 620. Based on the determination, method 600 maps the secure location to the process if the secure location was not already mapped at step 630. In one embodiment, the mapping comprises use of kernel interfaces, such as shmat( ) and saving the pointer that indicates where in the process' memory space the secure location is mapped. In one embodiment, the methods disclosed herein will only copy the user space parameters from kernel space to the secure location based on a determination that the secure location is in fact mapped to the system call.

Figure 9:
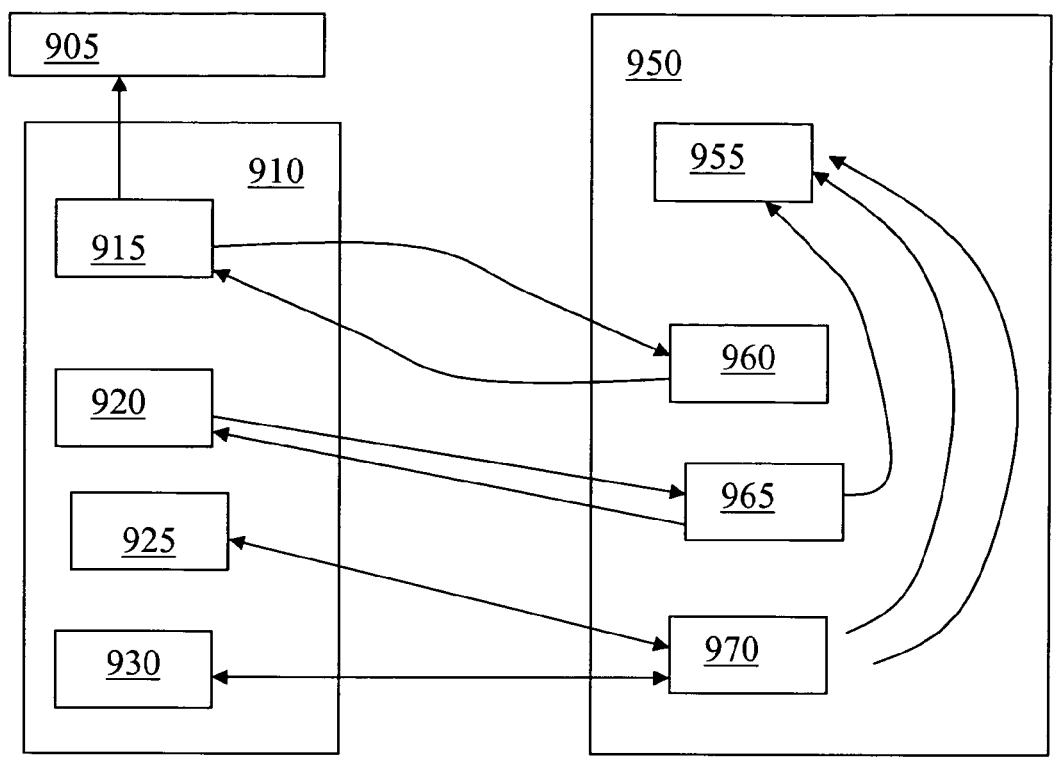
FIG. 9 illustrates another embodiment of a method for preventing time of check to time of use exploits in accordance with one aspect of the invention.

FIG. 9 graphically illustrates operation of the trusted daemon at 900, in accordance with one aspect of the invention. Trusted daemon 910 is shown in communication with secure location 905 and various elements of daemon 910 communicate with portions of kernel space 950. Process 915 gathers the secure memory location and attaches to the secure memory location by issuing calls to kernel space shared memory management 960 using, for example, shmget( ) and shmat( ). The kernel space shared memory management 960 returns the secure location information to process 915.

System call initialization 920 initializes with a call to the kernel space initialization 965, such as with kernel_param_copy_init( ). Kernel space initialization 965 initializes system call parameter copying state 955. After initialization, at least one service thread, 925, 930 are spawned. Each service thread 925, 930 communicates with the service thread code in the kernel 970. Service thread code 970 communicates with the system call parameter copying state 955 to determine the condition and to perform a copy of system call parameter data to the secure memory space.

Figure 10:
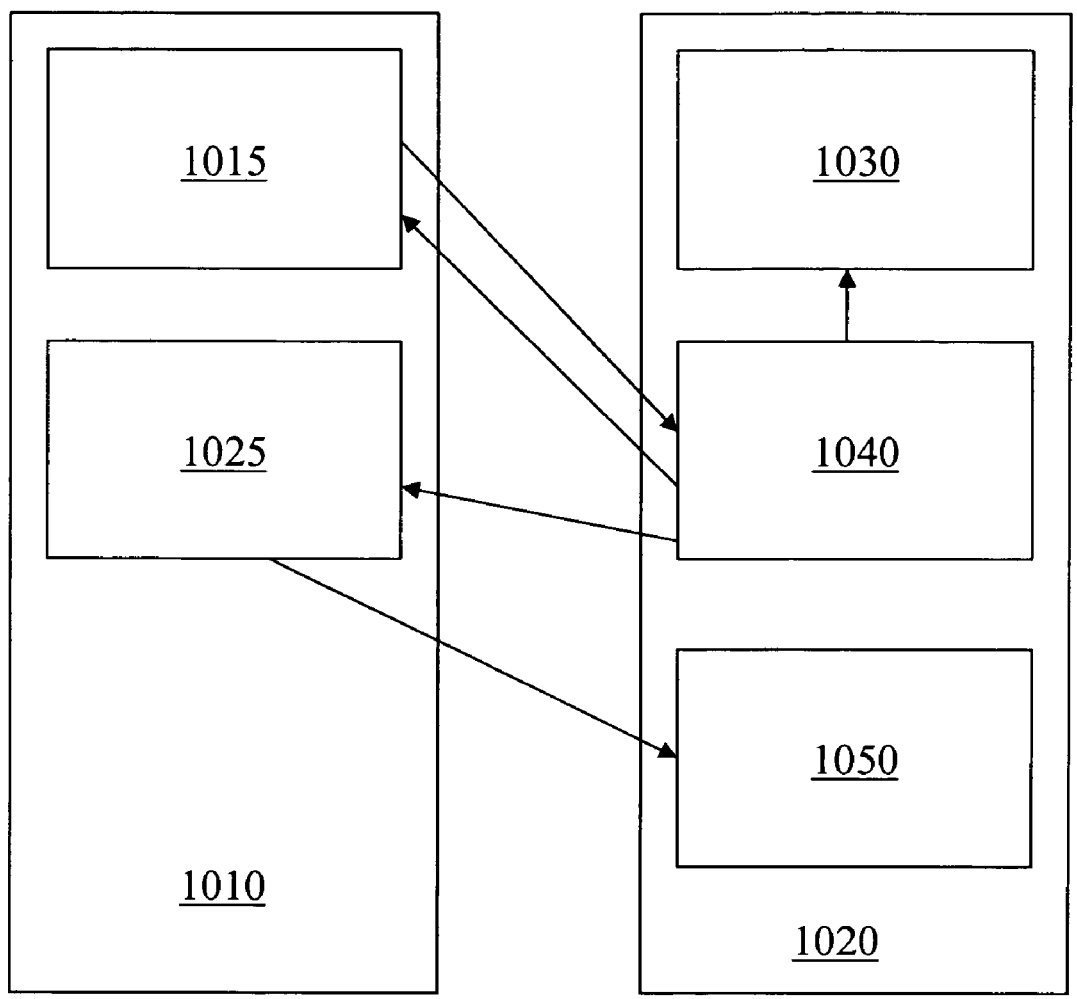
FIG. 10 illustrates another embodiment of a method for preventing time of check to time of use exploits in accordance with one aspect of the invention.

FIG. 10 graphically illustrates one embodiment of a method 1000 in accordance with one aspect of the invention. Shown are user space 1010 and kernel space 1020. Program 1015 in user space is issuing system calls with a reference to user space parameter data. System call intercept 1040 intercepts the system calls from program 1015, and copies the user space parameter data from user space, and potentially maps the secure memory space with copied user space parameter data to the program 1015, if the secure memory space is not already mapped. The user space parameter data are tracked in 1030 to track the state, condition, and request queue for the user space parameter copy. Upon copying the user space parameter data, using method 300 for example, the system call is invoked using the copied user space parameter data by the trusted daemon 1025. Trusted daemon 1025 operates using service thread code 1050 to copy the user space parameter data and wait for execution of the system call to return the memory (i.e., the secure location) to the kernel space for reuse.

The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device), or a propagation medium such as a carrier wave. Examples of a computer-readable medium include a semiconductor or solid-state memory, magnetic tape, a removable computer diskette, a random access memory (RAM), a read-only memory (ROM), a rigid magnetic disk and an optical disk.

While the embodiments of the present invention disclosed herein are presently considered to be preferred embodiments, various changes and modifications can be made without departing from the spirit and scope of the present invention. The scope of the invention is indicated in the appended claims, and all changes that come within the meaning and range of equivalents are intended to be embraced therein.

We claim:

1. A method of preventing time of check to time of use exploits, the method comprising:

receiving a system call from a user space at a system call intercept;

copying user space parameters from the user space to a kernel space responsive to the system call;

initiating a service thread within the kernel space, wherein the service thread is operable to create a secure location in the user space and pass an offset indicative of a location of the secure location to the system call interrupt;

copying the user space parameters from the kernel space to the secure location in the user space, wherein the service thread that creates and manages the secure location is contained in a trusted daemon;

receiving the user space parameters from the secure location at the system call intercept, wherein receiving the user space parameters from the secure location comprises receiving at least one pointer directed to the secure location;

determining whether the secure location is mapped to the system call; and mapping the secure location into an address space of a process making the system call based on the determination;

executing the system call based on the received user space parameters; and notifying the service thread based on execution of the system call, wherein the secure location is closed to all requests after the user space parameters are copied to the secure location and until the service thread is notified of system call execution.

2. The method of claim 1, wherein the secure location in the user space is a shared memory location.

3. The method of claim 1, wherein the secure location in the user space is a memory location whose access privileges are held only by kernel space entities or kernel space processes.

4. The method of claim 1, wherein the secure location in the user space is not accessible by user space entities or user space processes.

5. The method of claim 1, wherein the secure location in the user space is not persisted.

6. The method of claim 1, further comprising removing a copy of the user space parameters from the kernel space in response to copying the user space parameters from the kernel space to the secure location in the user space.

7. The method of claim 1, wherein the service thread provides the user space parameters from the secure location to the system call intercept.

8. The method of claim 1, wherein the user space parameters are provided from the secure location to the system call intercept in response to a direct request from one of the system call intercept or the trusted daemon.

9. The method of claim 1, wherein the secure location is closed prior to execution of the system call, and wherein the secure location is open for further use by a next system call following execution of the system call.

10. A computer program product comprising a computer readable storage medium having a computer readable program recorded thereon, wherein the computer readable program, when executed on a computing device, causes the computing device to:

receive a system call from a user space at a system call intercept;

copy user space parameters from the user space to a kernel space responsive to the system call;

initiate a service thread within the kernel space, wherein the service thread is operable to create a secure location in the user space and pass an offset indicative of a location of the secure location to the system call interrupt;

copy the user space parameters from the kernel space to the secure location in the user space, wherein the service thread that creates and manages the secure location is contained in a trusted daemon;

receive the user space parameters from the secure location at the system call intercept, wherein receiving the user space parameters from the secure location comprises receiving at least one pointer directed to the secure location;

determine whether the secure location is mapped to the system call; and map the secure location into an address space of a process making the system call based on the determination;

execute the system call based on the received user space parameters; and notify the service thread based on execution of the system call, wherein the secure location is closed to all requests after the user space parameters are copied to the secure location and until the service thread is notified of system call execution.

11. The computer program product of claim 10, wherein the secure location in the user space is a shared memory location.

12. The computer program product of claim 10, wherein the secure location in the user space is a memory location whose access privileges are held only by kernel space entities or kernel space processes.

13. The computer program product of claim 10, wherein the secure location in the user space is not accessible by user space entities or user space processes.

14. The computer program product of claim 10, wherein the secure location in the user space is not persisted.

15. The computer program product of claim 10, wherein the computer readable program further causes the computing device to remove a copy of the user space parameters from the kernel space in response to copying the user space parameters from the kernel space to the secure location in the user space.

16. The computer program product of claim 10, wherein the service thread provides the user space parameters from the secure location to the system call intercept.

17. The computer program product of claim 10, wherein the user space parameters are provided from the secure location to the system call intercept in response to a direct request from one of the system call intercept or the trusted daemon.

18. The computer program product of claim 10, wherein the secure location is closed prior to execution of the system call, and wherein the secure location is open for further use by a next system call following execution of the system call.

19. An apparatus, comprising:

a processor; and a memory coupled to the processor, wherein the memory comprises instructions which, when executed by the processor, cause the processor to:

receive a system call from a user space at a system call intercept;

copy user space parameters from the user space to a kernel space responsive to the system call;

initiate a service thread within the kernel space, wherein the service thread is operable to create a secure location in the user space and pass an offset indicative of a location of the secure location to the system call interrupt;

copy the user space parameters from the kernel space to the secure location in the user space, wherein the service thread that creates and manages the secure location is contained in a trusted daemon;

receive the user space parameters from the secure location at the system call intercept, wherein receiving the user space parameters from the secure location comprises receiving at least one pointer directed to the secure location;

determine whether the secure location is mapped to the system call; and map the secure location into an address space of a process making the system call based on the determination;

execute the system call based on the received user space parameters; and notify the service thread based on execution of the system call, wherein the secure location is closed to all requests after the user space parameters are copied to the secure location and until the service thread is notified of system call execution.

20. The apparatus of claim 19, wherein the secure location in the user space is a memory location whose access privileges are held only by kernel space entities or kernel space processes.

* * * * *

UNITED STATES PATENT AND TRADEMARK OFFICE
CERTIFICATE OF CORRECTION

| | | |
|---|---|---|
| PATENT NO. | : 7,657,936 B2 | Page 1 of 1 |
| APPLICATION NO. | : 11/333519 | |
| DATED | : February 2, 2010 | |
| INVENTOR(S) | : Kime et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1053 days.

Signed and Sealed this

Thirtieth Day of November, 2010

David J. Kappos
*Director of the United States Patent and Trademark Office*